United States Patent
Yu et al.

(10) Patent No.: US 7,663,835 B1
(45) Date of Patent: Feb. 16, 2010

(54) SYSTEM AND METHOD FOR IDENTIFYING TRACK SQUEEZE ERRORS (TSES) OF A DISK OF A DISK DRIVE

(75) Inventors: Jie Yu, Irvine, CA (US); Guoxiao Guo, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 244 days.

(21) Appl. No.: 11/770,554

(22) Filed: Jun. 28, 2007

(51) Int. Cl.
 *G11B 5/596* (2006.01)
(52) U.S. Cl. .................................... 360/77.04
(58) Field of Classification Search .............. 360/77.04, 360/75, 60, 77.02, 77.08, 78.04, 78.09
See application file for complete search history.

(56) References Cited

U.S. PATENT DOCUMENTS

| | | | |
|---|---|---|---|
| 5,612,833 A * | 3/1997 | Yarmchuk et al. | 360/75 |
| 5,793,559 A | 8/1998 | Shepherd et al. | |
| 5,844,742 A * | 12/1998 | Yarmchuk et al. | 360/75 |
| 5,889,631 A | 3/1999 | Hobson | |
| 5,907,447 A * | 5/1999 | Yarmchuk et al. | 360/75 |
| 5,930,068 A | 7/1999 | Gregg et al. | |
| 6,061,200 A | 5/2000 | Shepherd et al. | |
| 6,141,175 A | 10/2000 | Nazarian et al. | |
| 6,392,834 B1 * | 5/2002 | Ellis | 360/77.04 |
| 6,421,198 B1 | 7/2002 | Lamberts et al. | |
| 6,522,493 B1 | 2/2003 | Dobbek et al. | |
| 6,563,663 B1 | 5/2003 | Bi et al. | |
| 6,608,731 B2 * | 8/2003 | Szita | 360/75 |
| 6,611,397 B1 | 8/2003 | Nguyen | |
| 6,624,963 B2 | 9/2003 | Szita | |
| 6,654,198 B2 * | 11/2003 | Liu et al. | 360/77.04 |
| 6,657,810 B1 | 12/2003 | Kupferman | |
| 6,667,840 B1 | 12/2003 | Cheong et al. | |
| 6,735,040 B2 | 5/2004 | Galloway et al. | |
| 6,775,091 B1 | 8/2004 | Sutardja | |
| 6,785,084 B2 | 8/2004 | Szita | |
| 6,798,606 B2 | 9/2004 | Tang et al. | |
| 6,862,155 B2 | 3/2005 | Yang et al. | |
| 6,922,304 B2 | 7/2005 | Nakagawa | |
| 6,965,491 B1 | 11/2005 | Perlmutter et al. | |
| 6,972,922 B1 | 12/2005 | Subrahmanyam et al. | |
| 6,975,478 B2 | 12/2005 | Fukushima et al. | |
| 6,977,792 B1 | 12/2005 | Melrose et al. | |
| 6,995,941 B1 | 2/2006 | Miyamura et al. | |
| 6,999,266 B1 | 2/2006 | Schmidt | |
| 7,002,767 B2 | 2/2006 | Annampedu et al. | |
| 7,054,096 B1 | 5/2006 | Sun et al. | |
| 7,106,542 B1 | 9/2006 | Sun et al. | |

(Continued)

*Primary Examiner*—Fred Tzeng
(74) *Attorney, Agent, or Firm*—Blakely, Sokoloff, Taylor & Zafman

(57) ABSTRACT

A system and method for efficiently identifying track squeeze errors (TSEs) of a disk of a disk drive during a testing process for the disk drive is disclosed. The method includes reading servo bursts from a track of the disk, utilizing a modeled scan variable, and determining a gain comprising a ratio of a first matrix A and a second matrix B. TSEs associated with the SWEs of the servo bursts are determined for the track. The TSEs are determined as a product of the gain and a measured scan variable wherein the measured scan variable is calculated as being the difference between a measured scan value and an estimated nominal scan value.

31 Claims, 5 Drawing Sheets

U.S. PATENT DOCUMENTS

| | | |
|---|---|---|
| 7,106,547 B1 * | 9/2006 | Hargarten et al. ........ 360/77.04 |
| 7,110,209 B2 | 9/2006 | Ehrlich et al. |
| 7,119,981 B2 | 10/2006 | Hanson et al. |
| 7,123,433 B1 | 10/2006 | Melrose et al. |
| 7,167,336 B1 * | 1/2007 | Ehrlich et al. ............ 360/77.04 |
| 7,271,977 B1 | 9/2007 | Melrose et al. |
| 7,315,431 B1 | 1/2008 | Perlmutter et al. |
| 7,408,735 B1 | 8/2008 | Coric |
| 7,525,754 B2 | 4/2009 | Melrose et al. |
| 2001/0040755 A1 | 11/2001 | Szita |
| 2002/0067567 A1 | 6/2002 | Szita |
| 2005/0185319 A1 | 8/2005 | Liu et al. |
| 2007/0096678 A1 | 5/2007 | Melrose |
| 2007/0297088 A1 | 12/2007 | Sun et al. |
| 2008/0186617 A1 | 8/2008 | Hosono et al. |
| 2008/0239555 A1 | 10/2008 | Ehrlich et al. |
| 2009/0002874 A1 | 1/2009 | Melrose et al. |
| 2009/0086364 A1 | 4/2009 | Gerasimov |

* cited by examiner

SYSTEM AND METHOD FOR IDENTIFYING TRACK SQUEEZE ERRORS (TSES) OF A DISK OF A DISK DRIVE

BACKGROUND

1. Field

The present invention relates to disk drives. More particularly, the present invention relates to a system and method for identifying track squeeze errors (TSEs) of a disk of a disk drive.

2. Description of the Related Art

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk. Each servo sector typically includes at least a track identification (TKID) field, a sector ID field having a sector ID number to identify the sector, and a group of servo bursts (e.g. an alternating pattern of magnetic transitions) which the servo control system of the disk drive samples to align the moveable transducer head with or relative to a particular track. Typically, the servo control system moves the transducer head toward a desired track during a "seek" mode using the TKID field as a control input.

Once the moveable transducer head is generally over the desired track, the servo control system uses the servo bursts to keep the moveable transducer head over that track in a "track follow" mode. During track follow mode, the moveable transducer head repeatedly reads the sector ID field of each successive servo sector to obtain the binary encoded sector ID number that identifies each sector of the track. In this way, the servo control system continuously knows where the moveable transducer head is relative to the disk. Further, position error signals (PESs) are often utilized as a feedback signal for the servo control system during track following operations. The PES signal may be derived from read servo bursts as the head flies over the servo bursts of the servo sectors of the disk. The PES signal may be utilized by the servo control system to keep the head near the center of the track.

During manufacturing of a disk drive, servo sectors are typically written to a disk to define a plurality of evenly-spaced, concentric tracks. Servo writers are typically used to write the servo sectors to the disk during disk drive manufacturing. Servo writers often employ extremely accurate head positioning mechanics, such as laser interferometers or optical encoders, to ensure that the servo sectors are written at the proper radial location and extremely accurate clocking systems may be utilized in order to write the servo sectors in the proper circumferential locations on the disk.

As disk drive manufacturers have been forced to increase data capacity in disk drives to remain competitive, a greater number of tracks are required to be servo-written to each disk to provide for the increased data storage capacity. To accomplish this, the distance between each of the servo-written tracks has become increasingly smaller. Unfortunately, because of the smaller distance used between tracks during the servo-writing of the servo sectors, track squeeze errors (TSEs) may occur, in which servo bursts deviate from their normal positions. These TSEs may result in increased servo control errors and disk drive failure in both testing and normal operations.

During disk drive testing, disk drive manufacturers attempt to identify TSEs for tracks and attempt to compensate for them. Unfortunately, current methods often fail to adequately identify TSEs for tracks and require numerous track scans of a single track to identify TSEs such that the testing process is very time consuming and inefficient.

SUMMARY

In one embodiment of the invention, a method for identifying track squeeze errors (TSEs) of a disk of a disk drive during a testing process for the disk drive is disclosed. The method includes reading servo bursts from a track of the disk. The disk includes a plurality of tracks in which a substantial majority of the tracks include a plurality of servo bursts. The method further includes utilizing a modeled scan variable and determining a gain in which the gain includes a first matrix A and a second matrix B. Track squeeze errors (TSEs) associated with the servo written-in errors (SWEs) of the servo bursts for the track are determined. The TSEs are determined as a product of the gain and a measured scan variable wherein the measured scan variable is calculated as being the difference between a measured scan value and an estimated nominal scan value.

In another embodiment of the invention, a system to identify track squeeze errors (TSEs) of a disk during a testing process is disclosed. The system includes a disk having a plurality of tracks in which a substantial majority of the tracks include a plurality of servo bursts, a moveable head to read the servo bursts of the track, and a microprocessor for controlling operations including operations for determining track squeeze errors (TSEs). The microprocessor under the control of a program is utilized to: read servo bursts from a track of the disk, utilize a modeled scan variable, determine a gain comprising a ratio of a first matrix A and a second matrix B, and determine track squeeze errors (TSEs) associated with the servo written-in errors (SWEs) of the servo bursts for the track. The TSEs are determined as a product of the gain and a measured scan variable wherein the measured scan variable is calculated as a difference between a measured scan value and an estimated nominal scan value.

The foregoing and other features of the invention are described in detail below and are set forth in the appended claims.

DETAILED DESCRIPTION

Figure 1:
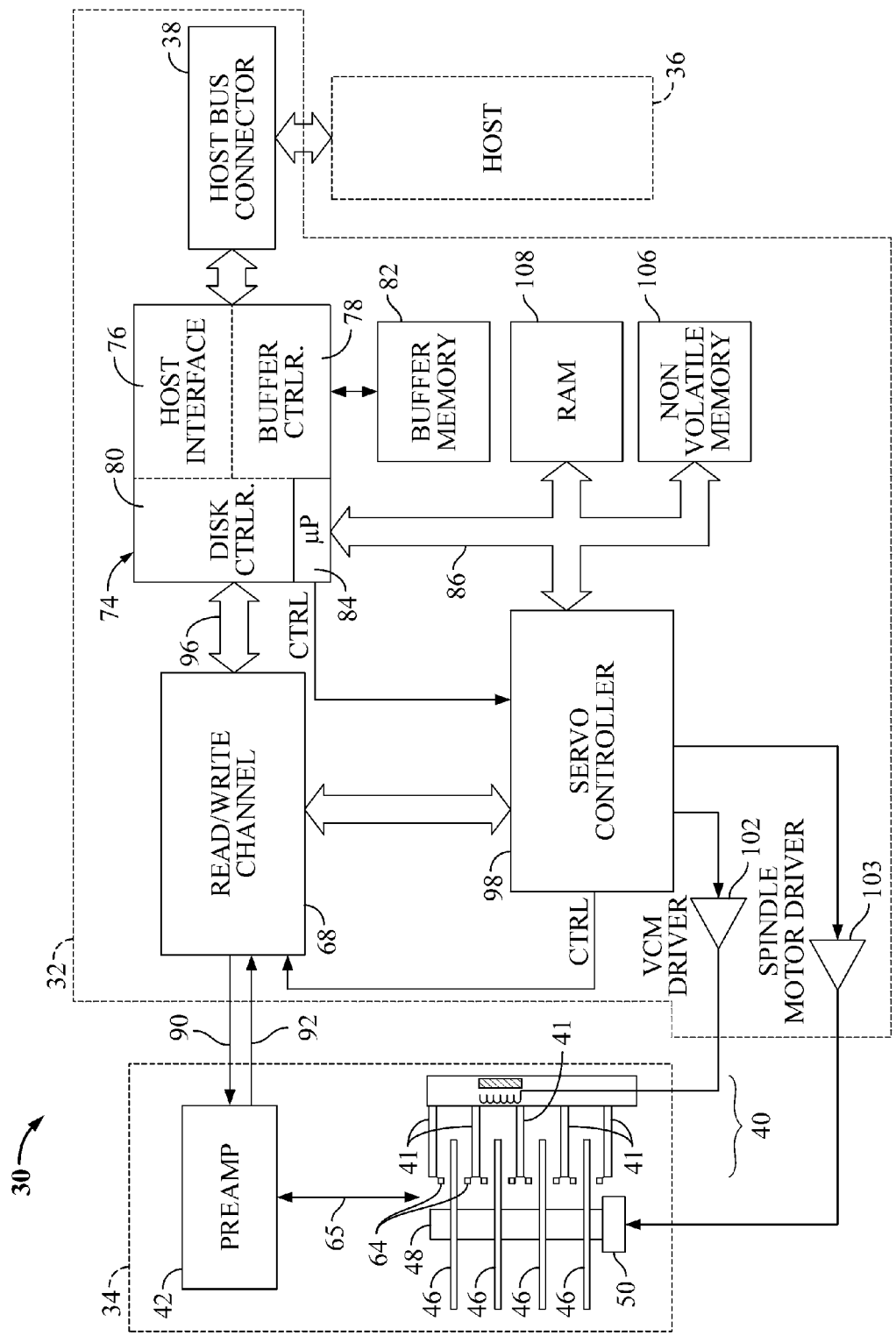
FIG. 1 shows a simplified block diagram of a disk drive and a host, in which embodiments of the invention may be practiced.

FIG. 1 shows a simplified block diagram of a disk drive 30, in which embodiments of the invention may be practiced. Disk drive 30 may comprise a Head/Disk Assembly (HDA) 34 and a controller printed circuit board assembly (PCBA) 32. In one embodiment, disk drive 30 utilizing a microprocessor under the control of a program or routine may execute methods or processes to efficiently identify track squeeze errors (TSEs) in a disk track during testing, as will be described in more detail later. Host 36 may be a computing device such as a desktop computer, a laptop computer, server computer, a mobile computing device (e.g. PDA, camera, cell-phone, etc.), or any type of computing device.

Alternatively, in one embodiment, host 36 may be a test computer having a microprocessor that may operate under the control of a program or routine to execute methods or processes to efficiently identify track-squeeze errors (TSEs) in a disk track during testing, as will be described in more detail later.

Disk drive 30 may be of a suitable form factor and capacity for larger computers or for smaller mobile devices (e.g. a small form factor (SFF) disk drive).

HDA 34 may include: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Microprocessor 84 may operate under the control of a program or routine to execute methods or processes to efficiently identify and determine track squeeze errors (TSEs) in a disk track during testing, in accordance with embodiments of the invention, as will be described in more detail later.

Host initiated operations for reading and writing data in disk drive 30 may be executed under control of microprocessor 84 of HIDC 74 which is connected to the controllers and memory arrays via bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 may be encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Channel 68 may employ PRML (partial response maximum likelihood) coding techniques, although other coding processes may be utilized.

HIDC 74 includes disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

In one embodiment, disk drive 30 employs a sampled servo system in which equally spaced servo sectors are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98, to provide position information to microprocessor 84 via bus 86.

Figure 2:
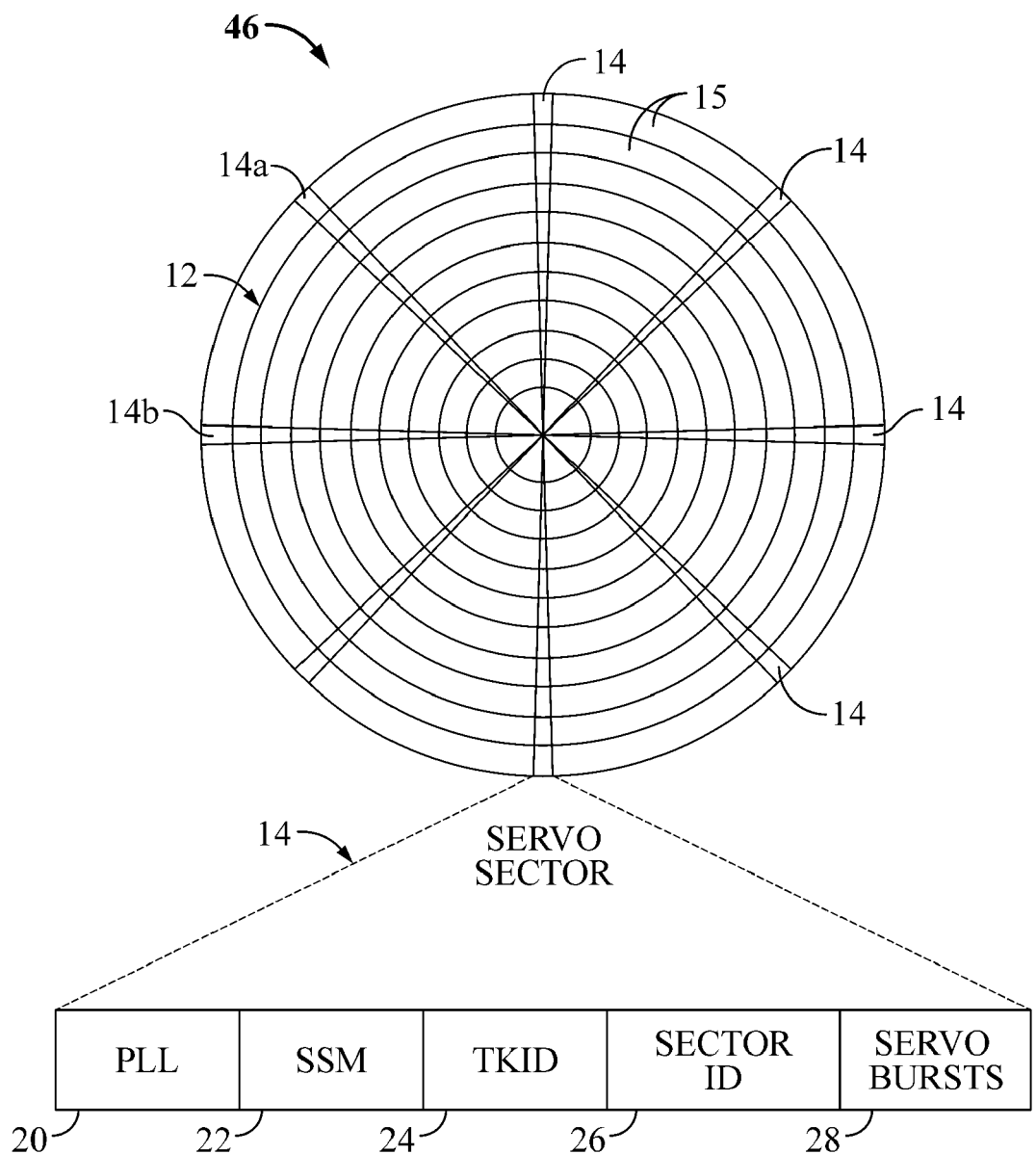
FIG. 2 is a diagram showing a disk of the disk drive of FIG. 1 having a plurality of concentric tracks, and more particularly, illustrates components of a servo sector.

FIG. 2 shows a disk 46 of the disk drive 30 of FIG. 1 having a plurality of concentric tracks, and more particularly, illustrates components of a servo sector 14. Disk 46 includes a plurality of concentric circumferential tracks 12. Each circumferential track 12 includes a plurality of embedded servo sectors 14 utilized in seeking and track following. The plurality of servo sectors 14 may be spaced sequentially around a circumference of the circumferential track 12. For example, embedded servo sectors 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo sector 14.

Each servo sector 14 may include a phase lock loop (PLL) field 20, a servo synch mark (SSM) field 22, a track identification (TKID) field 24, a sector identifier (ID) 26, and a group of servo bursts 28, such as an alternating pattern of magnetic transitions, that the servo control system samples to align the moveable transducer head with, and relative to, a particular track. Typically, servo controller 98 moves the transducer head 64 toward a desired track during a "seek" mode using the TKID field 24 as a control input.

In processing information, to ensure consistency in the detection of bits composing a block of bits, the phase lock loop (PLL) field 20 is first read in order to facilitate bit synchronization. Next, the servo synch mark 22 is read to facilitate block synchronization. The SSM 22 facilitates block synchronization by acting as a special marker that is detected to "frame" data, i.e., to identify a boundary of a block. A valid servo synchronization signal results in the read/write channel 68 of the disk drive 30 establishing a precise timing reference point for the reading of servo data and for read/write operations. It is well known to provide framing of servo data via a SSM. The sector ID 26 is a binary encoded sector ID number to identify the sector.

Further, once the transducer head 64 is generally over a desired track 12, the servo controller 98 uses servo bursts 28 to keep the transducer head 64 over the track in a "track follow" mode based upon demodulated PES values from the read servo bursts. During track following mode, the moveable transducer head 64 repeatedly reads the sector ID 26 of each successive servo sector to obtain the binary encoded sector ID number that identifies each sector of the track.

Based on the TKID and sector ID, the servo controller 98 continuously knows where the head 64 is relative to the disk 46 and communicates this to microprocessor 84. In this way, the microprocessor 84 continuously knows where the head 64 is relative to the disk and can command the movement of the head 64, via the servo control system, to implement disk drive operations, such as seeking, tracking, read/write operations, etc.

Figure 3:
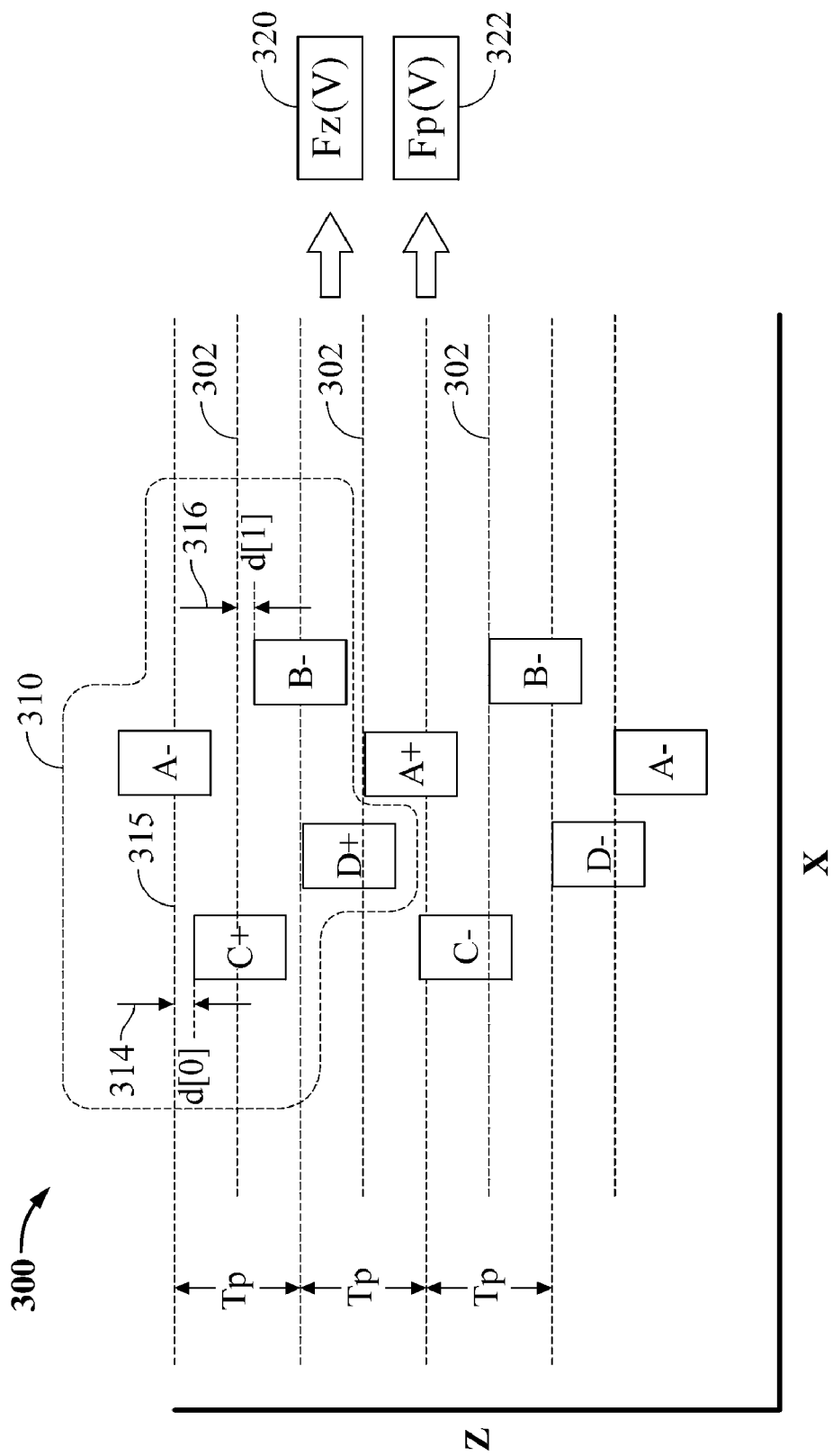
FIG. 3 is a diagram that illustrates an example of servo bursts A, B, C, and D that have been previously servo-written to a track of a disk.

FIG. 3 is a diagram 300 that illustrates an example of servo bursts A, B, C, and D that have been previously servo-written to a track. The z-axis is in the radial direction of the disk and the x-axis is along the longitudinal direction of the disk. Three tracks (each with track pitch Tp) are shown each having a respective track center 302.

In particular, FIG. 3 illustrates that when servo bursts A, B, C, and D are written to a track during the servo-writing process they typically include a plurality of servo written-in error (SWEs). There may be two servo writing steps (one burst written at each step) for one track shown. As can be seen in FIG. 3, with respect to group 310, two examples of SWEs are shown: d[0] 314 with respect to servo burst C+ (where "+" represents in phase with preamble while "−" represents out of phase with preamble) and track boundary 315; and d[1] 316 with respect to B− and track center 302. These SWEs d[0] 314 and d[1] 316 may be estimated and denoted as track-squeeze errors (TSEs), as will be described in more detail hereinafter.

In particular, based upon a PES demodulation estimate ($F_z(v)$) 320 from the voltage read-out signal from the head and an estimate of the servo written-in errors ($F_p(v)$) 322 based upon physical characterization of the disk drive, track squeeze errors (TSEs) for a track may be estimated. With brief reference back to FIG. 1, the foregoing functionality may be implemented by the microprocessor 84 of the disk drive 30 itself or by a host test computer 36 during disk drive testing and initialization, for example, as part of an intelligent burn-in process. During this testing process, head 64 track-follows on a track of disk 46 to characterize the TSEs for the track. In one particular embodiment, TSEs for a track may be efficiently characterized with only one track scan, as compared to other common methods of 2 scan per track (equivalently 1 scan per servo writing step).

In one embodiment, in order to model $F_z(v)$ and $F_p(v)$, the readback signal magnitude of magnetization M by using a head with sensitivity function H is modeled by a reciprocity integral of the form:

$$V(z_r, p) = \int_{-\infty}^{\infty} H(z - z_r, p) M(z, p) dz + n(p) \qquad (1)$$

It should be appreciated that, as is known in the art, the head may include both a read element (i.e., a reader) and a write element, however, in the following specification the terms head and reader are interchangeably used. In particularly subscript r is used to denote the reader in many of the following equations. In the equation above:

z is a modeled reader position and $z_r$ is the actual reader position;

p is a parameter that corresponds to the physical parameters of the disk drive including physical characterizations and disturbance characterizations; and n(p) variable is utilized to model electrical noise.

It should be noted that p includes the servo written-in errors (SWEs). Further, the p parameter may include other head-related parameters such as: writer width characterizations ($W_w$); reader width characterizations ($R_w$); and read time off-track position errors (RTE).

Using the previously-described equations, for four servo bursts, the magnitude of the four burst reading can be represented by:

$$V(z_r, \delta_p) = V_0(z_r) + S(z_r) * \delta_p \qquad (2)$$

where $$V(z_r, \delta_P) = \begin{bmatrix} V_A(z_r, \delta_P) \\ V_C(z_r, \delta_P) \\ V_B(z_r, \delta_P) \\ V_D(z_r, \delta_P) \end{bmatrix}, \quad V_0(z_r) = \begin{bmatrix} V_{A0}(z_r) \\ V_{C0}(z_r) \\ V_{B0}(z_r) \\ V_{D0}(z_r) \end{bmatrix}, \qquad (3)$$

$$\delta_P = \delta \begin{bmatrix} p_1 \\ \vdots \\ \vdots \\ p_k \end{bmatrix} = \delta \begin{bmatrix} T_P \\ W_w \\ R_w \\ WIE \\ RTE \\ n \end{bmatrix}, \quad WIE = \begin{bmatrix} d[0] \\ \vdots \\ \vdots \\ d[7] \end{bmatrix},$$

$$n = \begin{bmatrix} n_A \\ n_C \\ n_B \\ n_D \end{bmatrix}, \quad S(z_r) = \begin{bmatrix} \frac{\partial V_A}{\partial p_1} & \cdots & \cdots & \frac{\partial V_A}{\partial p_k} \\ \frac{\partial V_C}{\partial p_1} & \cdots & \cdots & \frac{\partial V_C}{\partial p_k} \\ \frac{\partial V_B}{\partial p_1} & \cdots & \cdots & \frac{\partial V_B}{\partial p_k} \\ \frac{\partial V_D}{\partial p_1} & \cdots & \cdots & \frac{\partial V_D}{\partial p_k} \end{bmatrix},$$

Considering the written-in error $P_d$, which consists of the burst distortion d[i] at relevant SW steps, a burst reading matrix is as follows:

$$B_r = V(A,B,C,D) - V_0(A,B,C,D) = S * P_d \qquad (4)$$

Above, $V_0$ is the nominal value, or it may be a measured average value representing the average burst reading in the same zone, $P_d$ is the per wedge SWE that is frozen into the servo wedge, and S is the sensitivity matrix As one application of the modeling of the burst reading vs. off track and the written-in error sensitivity model given above, the servo zone boundary (line) representation notation may be considered as follows:

Track center $Z_r[0]=Z_{r0}$ where: $(A-B)-(C-D)=0$
Quarter track $Z_r[1]=Z_{r25}$ where: $(A-B)=0$
Half track $Z_r[2]=Z_{r50}$ where: $(A-B)+(C-D)=0$
Quarter track $Z_r[3]=Z_{r75}$ where: $(C-D)=0$ The sensitivity of burst readout V at a zone line with respect to the above-described parameters may be described as follows below:

$$S_V[j] = \frac{d}{dp}=V(z_r[j], p) = \frac{\partial V}{\partial z_r}(z_r[j], p)\frac{dz_r}{dp}+\frac{\partial V}{\partial p} \quad (5)$$

$$\cdot(z_r[j], p) = \begin{bmatrix} \frac{\partial V_A}{\partial z_r} \\ \frac{\partial V_C}{\partial z_r} \\ \frac{\partial V_B}{\partial z_r} \\ \frac{\partial V_D}{\partial z_r} \end{bmatrix} \begin{bmatrix} \frac{\partial z_r[j]}{\partial p_1} & \cdots & \cdots & \frac{\partial z_r[j]}{\partial p_k} \end{bmatrix} + \begin{bmatrix} \frac{\partial V_A}{\partial p_1} & \cdots & \cdots & \frac{\partial V_A}{\partial p_k} \\ \frac{\partial V_C}{\partial p_1} & \cdots & \cdots & \frac{\partial V_C}{\partial p_k} \\ \frac{\partial V_B}{\partial p_1} & \cdots & \cdots & \frac{\partial V_B}{\partial p_k} \\ \frac{\partial V_D}{\partial p_1} & \cdots & \cdots & \frac{\partial V_D}{\partial p_k} \end{bmatrix} =$$

$$\begin{bmatrix} \frac{\partial V_A}{\partial z_r}\frac{\partial z_r[j]}{\partial p_1}+\frac{\partial V_A}{\partial p_1} & \cdots & \cdots & \frac{\partial V_A}{\partial z_r}\frac{\partial z_r[j]}{\partial p_k}+\frac{\partial V_A}{\partial p_k} \\ \frac{\partial V_C}{\partial z_r}\frac{\partial z_r[j]}{\partial p_1}+\frac{\partial V_C}{\partial p_1} & \cdots & \cdots & \frac{\partial V_C}{\partial z_r}\frac{\partial z_r[j]}{\partial p_k}+\frac{\partial V_C}{\partial p_k} \\ \frac{\partial V_B}{\partial z_r}\frac{\partial z_r[j]}{\partial p_1}+\frac{\partial V_B}{\partial p_1} & \cdots & \cdots & \frac{\partial V_B}{\partial z_r}\frac{\partial z_r[j]}{\partial p_k}+\frac{\partial V_B}{\partial p_k} \\ \frac{\partial V_D}{\partial z_r}\frac{\partial z_r[j]}{\partial p_1}+\frac{\partial V_D}{\partial p_1} & \cdots & \cdots & \frac{\partial V_D}{\partial z_r}\frac{\partial z_r}{\partial p_k}+\frac{\partial V_D}{\partial p_k} \end{bmatrix}$$

For illustration, an example from a disk drive is described below with substituted parameters:

$$\delta\begin{bmatrix} z_r[0] \\ z_r[1] \\ z_r[2] \\ z_r[3] \\ z_r[4] \\ z_r[5] \end{bmatrix} = \begin{bmatrix} 0.1247 & 0.3754 & 0.3754 & 0.1247 & 0 & 0 \\ 0 & 0.5 & 0 & 0.5 & 0 & 0 \\ 0 & 0.1247 & 0.3754 & 0.3754 & 0.1247 & 0 \\ 0 & 0 & 0.5 & 0 & 0.5 & 0 \\ 0 & 0 & 0.1247 & 0.3754 & 0.3754 & 0.1247 \\ 0 & 0 & 0 & 0.5 & 0 & 0.5 \end{bmatrix} \begin{bmatrix} d[-1] \\ d[0] \\ d[1] \\ d[2] \\ d[3] \\ d[4] \end{bmatrix} \quad (6)$$

Since zone width is $L_r(i)=z_r(i+1)-z_r(i)$, the zone line boundary changes due to the written in errors $d[-1, \sim 3]$, can be written as follows:

$$\delta\begin{bmatrix} L_r[0] \\ L_r[1] \\ L_r[2] \\ L_r[3] \\ L_r[4] \end{bmatrix} = \quad (7)$$

$$\begin{bmatrix} -0.1247 & 0.1246 & -0.3754 & 0.3754 & 0 & 0 \\ 0. & -0.3753 & 0.3754 & -0.1246 & 0.1247 & 0 \\ 0 & -0.1247 & 0.1246 & -0.3754 & 0.3753 & 0 \\ 0 & 0 & -0.3753 & 0.3754 & -0.1246 & 0.1247 \\ 0 & 0 & -0.1247 & 0.1246 & -0.3754 & 0.3753 \end{bmatrix}$$

$$\begin{bmatrix} d[-1] \\ d[0] \\ d[1] \\ d[2] \\ d[3] \\ d[4] \end{bmatrix}$$

Which is notated as:

$$L_z = Z_b P_d \quad (8)$$

Wherein $L_z$ is the zone boundary lines changes and $Z_b$ is the zone boundary sensitivity to TWE disturbance vector $P_d$. Further defining $V[i, A]$, the A burst readout signal at $Z_r[i]$, and similarly for B, C, D bursts and substituting V into equation (5), the following may be obtained for the tested disk drive.

Single Track Scan Case

In the single track scan case, only one track's bursts are read. For the example disk drive:

$$\delta\begin{bmatrix} V[0, A] \\ V[0, C] \\ V[0, B] \\ V[0, D] \end{bmatrix} = \quad (9)$$

$$\begin{bmatrix} 0.0381 & 0.1147 & 0.1147 & -0.2675 & 0 & 0 \\ 0.2675 & -0.1147 & -0.1147 & -0.0381 & 0 & 0 \\ -0.1147 & 0.5748 & -0.3454 & -0.1147 & 0 & 0 \\ 0.1147 & 0.3454 & -0.5748 & 0.1147 & 0 & 0 \end{bmatrix} \begin{bmatrix} d[-1] \\ d[0] \\ d[1] \\ d[2] \\ d[3] \\ d[4] \end{bmatrix}$$

The above can be notated as:

$$B_r = SP_d \quad (10)$$

Which leads to:

$$P_d = \text{pinv}(S)*B_r \quad (11)$$

Wherein $B_r$ is the burst reading vector, S is the burst reading sensitivity to track written-in errors (TWE) disturbance vector $P_d$ having the same dimension as in the earlier case, and pinv(S) is a psuedo-inverse of the matrix S. One possible choice for pinv(S) is the Moore-Penrose inverse which is given by:

$$\text{Pinv}(S) = \text{inv}(S'*S)*S'$$

Wherein S' is the matrix transpose of S, when the invertibility condition of (S*S') is met. Otherwise some least-square solution can be used where only the invertible subspace of S is inverted while the null subspace is intact, as done by an application program, such as, MATLAB.

When multiple scan variables are used (e.g., V at multiple $Z_r$'S, such as at multiple track centers), the size of S grows and more information associated with the SWEs affecting the $L_z$ is contained by the scan variables and can be used for a better estimation of TSEs.

Correspondingly, $$L_z = Z_b \text{pinv}(S) B_r \qquad (12)$$

and by noting, $$Z_B = Z_b \text{pinv}(S) \qquad (13)$$

the below is obtained:

$$L_z = Z_B * B_r \qquad (14)$$

The numerical values in equations (7) now can be written in a reduced order form as, $$\delta L_r[0] = [\,-0.1247\ \ 0.1246\ \ -0.3754\ \ 0.3754\ \ 0\ \ 0\,] \begin{bmatrix} d[-1] \\ d[0] \\ d[1] \\ d[2] \\ d[3] \\ d[4] \end{bmatrix}$$

Combining with equation (9) for the example disk drive, one TSE estimation is given by:

$$\delta L_r[0] = Z_B * [V[0,A], V[0,B], V[0,C], V[0,D]]'$$

Where:

$$Z_B = [-1.0915\ \ -0.5450\ \ -0.0016\ \ 0.5449].$$

The measurement error can be estimated as:
$Z_b - Z_B * S = [-0.2500\ \ -0.2500\ \ -0.2500\ \ -0.2500] \times 1 \times 10^{-4}$ In this example, if Lr[1]~Lr[3] are to be estimated using the same scan variable, there may be substantial estimation error. Some common methods are adding more scan variables at other off-track locations (such as half track or ⅓ track). The following method also provides a solution by reading multiple tracks.

Multiple Track Scan Case

The method above may be implemented by using multiple tracks per single scan. By adding more rows to the matrix S, the invertibility condition will improve therefore more likely to eliminate the error. Here we give an example of using two tracks' measurement data to construct $L_z$ but one can follow the same method and expand to more than two tracks. For the same example drive above, when scanning two tracks a time, one obtains:

$$\delta \begin{bmatrix} V[0,A] \\ V[0,C] \\ V[0,B] \\ V[0,D] \\ V[4,A] \\ V[4,C] \\ V[4,B] \\ V[4,D] \end{bmatrix} =$$

$$\begin{bmatrix} 0.0381 & 0.1147 & 0.1147 & -0.2675 & 0 & 0 \\ 0.2675 & -0.1147 & -0.1147 & -0.0381 & 0 & 0 \\ -0.1147 & 0.5748 & -0.3454 & -0.1147 & 0 & 0 \\ 0.1147 & 0.3454 & -0.5748 & 0.1147 & 0 & 0 \\ 0 & 0 & -0.1147 & 0.5748 & -0.3454 & -0.1147 \\ 0 & 0 & 0.1147 & 0.3454 & -0.5748 & 0.1147 \\ 0 & 0 & 0.0381 & 0.1147 & 0.1147 & -0.2675 \\ 0 & 0 & 0.6275 & -0.1147 & -0.1147 & -0.0381 \end{bmatrix} \begin{bmatrix} d[-1] \\ d[0] \\ d[1] \\ d[2] \\ d[3] \\ d[4] \end{bmatrix}$$

Following equations (10)-(14), one obtains:

$$Z_B = \begin{bmatrix} -0.5609 & -0.4386 & 0.1048 & 0.2270 & 0.3179 & -0.1064 & -0.1064 & -0.5.07 \\ -0.0377 & -0.0077 & -0.4154 & -0.3853 & -0.1580 & -0.1279 & 0.0077 & 0.0377 \\ 0.0377 & 0.0077 & -0.1279 & -0.1580 & -0.3583 & -0.4154 & -0.0077 & -0.0377 \\ -0.5306 & -0.1064 & -0.1064 & 0.3178 & 0.2270 & 0.1048 & -0.4386 & -0.5608 \\ -0.2269 & -0.0454 & -0.0455 & 0.1360 & 0.5904 & -1.0457 & -1.0457 & -0.3178 \end{bmatrix}, \quad (15)$$

$$\delta \begin{bmatrix} L_r[0] \\ L_r[1] \\ L_r[2] \\ L_r[3] \\ L_r[4] \end{bmatrix} = Z_B \delta \begin{bmatrix} V[0,A] \\ V[0,C] \\ V[0,B] \\ V[0,D] \\ V[4,A] \\ V[4,C] \\ V[4,B] \\ V[4,D] \end{bmatrix}$$

It should be noted that in the above equation, on average, there is only a need to measure one V to find one zone width variation $\delta L_r$. In this case, the estimation may be close but not perfect. This can be shown by the estimation gain error:

$$Z_b - Z_B * S = \begin{bmatrix} -0.1667 & -0.1667 & -0.1667 & -0.1667 & -0.1667 & -0.1667 \\ 0.3333 & 0.3333 & 0.3333 & 0.3333 & 0.3333 & 0.3333 \\ -0.3333 & -0.3333 & -0.3333 & -0.3333 & -0.3333 & -0.3333 \\ 0.3333 & 0.3333 & 0.3333 & 0.3333 & 0.3333 & 0.3333 \\ -0.3333 & -0.3333 & -0.3333 & -0.3333 & -0.3333 & -0.3333 \end{bmatrix} * 1 \times 10^{-4}.$$

Hence, an estimate of $\delta L_r[0]$ to $\delta L_r[4]$ using A B C D burst measurements of two tracks is achieved.

So in this case, when calculating any combination of $L_r[0] \sim L_r[4]$, i.e., any on track and/or quarter track boundary line change for consecutive two tracks, only one position per track needs to be measured. The estimation error is zero excluding numerical tolerance.

In the above, A, B, C, D bursts at V[0] and V[4] were chosen. One can choose other combinations from V[0]~V[4] as long as $Z_B$ can be calculated following the procedure above.

To summarize the above steps:

$$L_z = Z_B * B_r$$

Wherein $Z_B$ is a sensitivity vector that is predetermined to work with the dimension of burst reading vector $B_r$. As a result, depending upon which row of $L_L$ (i.e., which track's zone boundary variation) is to be determined, the corresponding compounding $B_r$ components can be measured for use in the detection.

Of particular note, as above, is that one or multiple tracks can be used to efficiently characterize TSEs with one scan.

Figure 4:
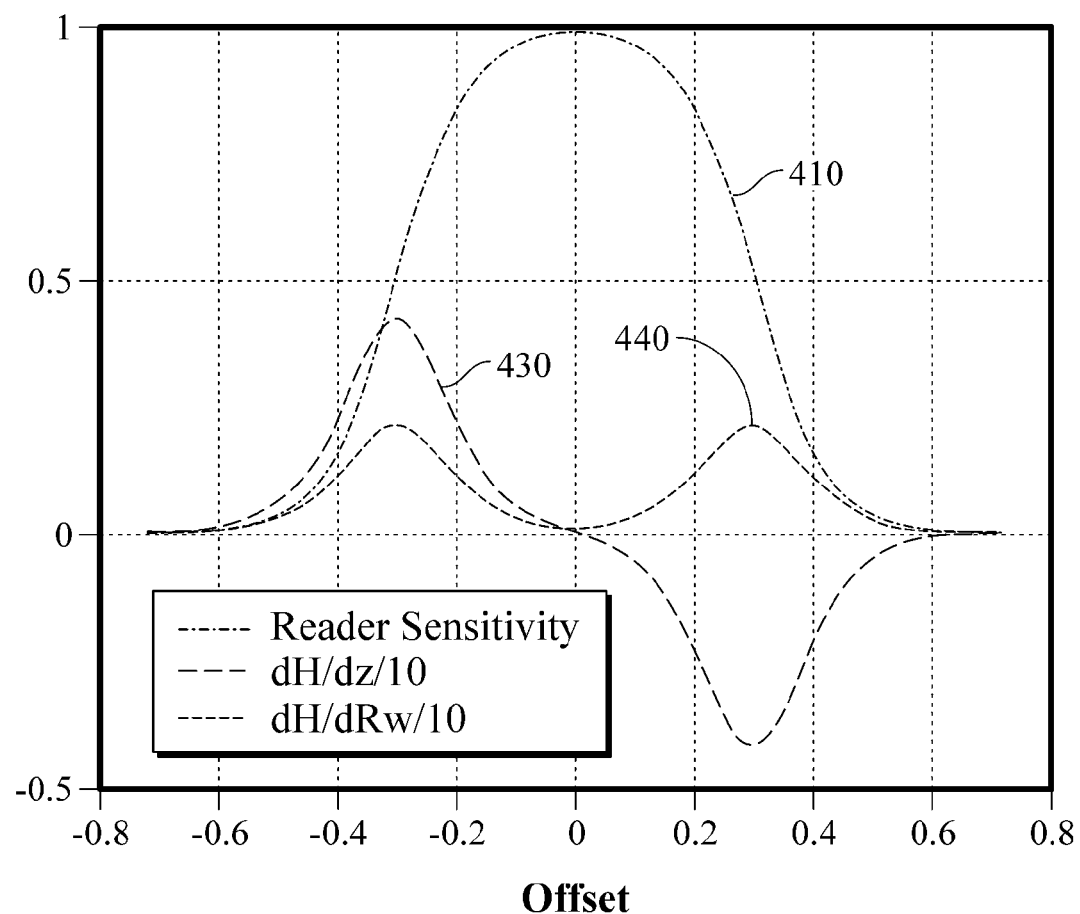
FIG. 4 is a graph that illustrates an example of reader characterization that may be utilized in the characterization of a modeled reader sensitivity function, according to one embodiment of the invention.

FIG. 4 is a graph that illustrates an example of reader characterization that may be utilized in the characterization of the modeled reader sensitivity function H, for the equations above. In one embodiment, reader characterization is performed for a class of disk drives prior to testing individual disk drive for TSEs.

In FIG. 4, the y axis corresponds to reader sensitivity H in terms of a normalized readout signal amplitude and the x-axis corresponds to track offset. In particular, FIG. 4 shows a graph of reader sensitivity 410 for a reader of a disk drive. Further, FIG. 4 shows a graph of the partial derivative of H in terms of position and graph 430 of the partial derivative of H in terms of reader width 440. These values may be utilized in defining a modeled reader sensitivity function H for a disk drive.

In one example, modeled reader sensitivity function H may be defined as:

$$\tilde{H}(\tilde{z}, R_w, s_{kl}, s_{kr}) = H(z, R_w, s_{kl}, s_{kr}) = H(T_p\tilde{z}, R_w, s_{kl}, s_{kr})$$

In the above equation z refers to position, $R_w$ refers to reader width, $s_{kl}$ and $s_{kr}$ refer to two head side reading parameters (called left and right reader "shirt" width) in the reader sensitivity model, and $T_p$ refers to track pitch.

Further, the derivatives for the modeled reader sensitivity function H may be defined as:

$$\frac{d}{d\tilde{z}}\tilde{H}(\tilde{z}, R_w, s_{kl}, s_{kr}) = \frac{d}{d\tilde{z}}H(T_p\tilde{z}, R_w, s_{kl}, s_{kr}) = T_p\frac{d}{d\tilde{z}}H(z, R_w, s_{kl}, s_{kr})$$

$$\frac{\partial}{\partial T_P}\tilde{H}(\tilde{z}, R_w, s_{kl}, s_{kr}) = 0$$

$$\frac{\partial}{\partial R_w}\tilde{H}(\tilde{z}, R_w, s_{kl}, s_{kr}) =$$

$$\frac{\partial}{\partial R_w}H(z, R_w, s_{kl}, s_{kr}) = \frac{\partial}{\partial R_w}H(T_p\tilde{z}, R_w, s_{kl}, s_{kr})$$

Figure 5:
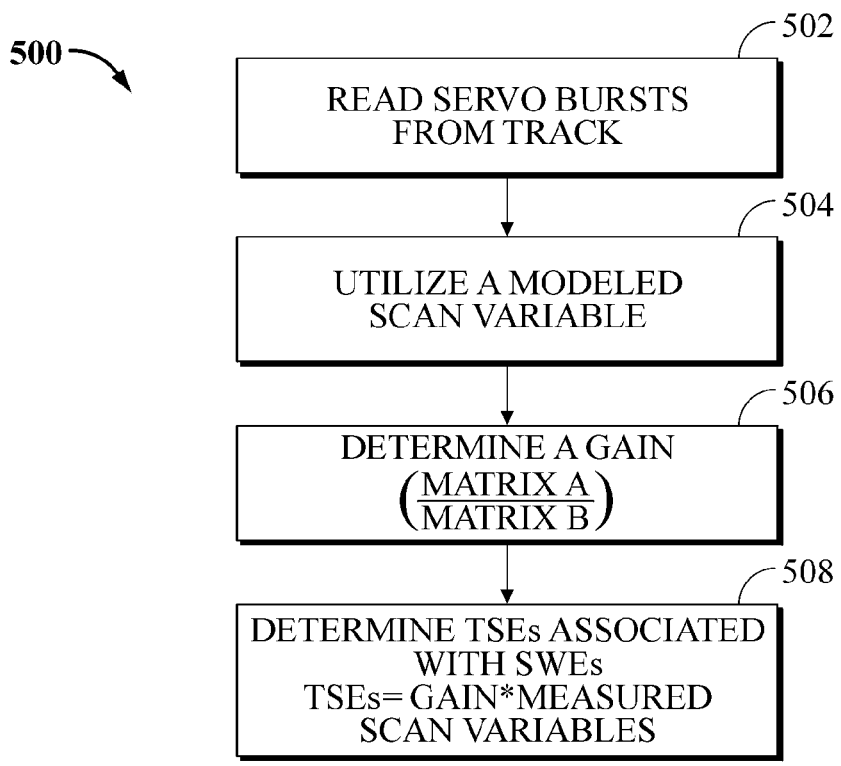
FIG. 5 is flow diagram that illustrates operations to implement embodiments the invention related to efficiently identifying and determining track squeeze errors (TSEs) for a disk of a disk drive during a testing process for the disk drive, according to one embodiment of the invention.

FIG. 5 is flow diagram that illustrates operations 500 to implement embodiments of the invention related to efficiently identifying and determining track squeeze errors (TSEs) for a disk of a disk drive during a testing process for the disk drive. Process 500 utilizes aspects of the previously-described equations to provide a simplified and efficient methodology to achieve estimated TSEs. At block 502, servo bursts (e.g. A, B, C, D) are read from a track of a disk. For example, servo burst group 310 of FIG. 3 may be read as an illustration. In this example, TSEs 314 and 316 are identified and characterized by process 500. Next a modeled scan variable is utilized to aid in identifying the TSEs associated with the track of the disk (block 504). In particular, the modeled scan variable may be characterized by the product of a matrix B and the servo written-in errors (SWEs) of the servo bursts.

Next a gain is determined. In one embodiment, the gain may be a ratio of a first matrix A and a second matrix B, as will be described in more detail hereinafter.

At block 508, the TSEs associated with the SWEs of the servo bursts for the track may be determined. The TSEs may be determined as a product of the gain and a measured scan variable. The measured scan variable may be calculated as a difference between a measured scan value and an estimated nominal scan value. Thus, the TSEs may be determined by an equation of the form:

TSEs=(matrix A)/(matrix B)*measured scan variable, where "/(matrix B)" denotes a pseudo-inverse of the matrix B.

In one embodiment, matrix A includes gain values associated with the sensitivity of the TSEs with respect to the SWEs and matrix B includes gain values associated with the sensitivity of the servo burst read-out voltage measurements with respect to the SWEs.

The TSEs may be characterized by a linearized model for the SWEs. In this exemplary model [e.g. F(SWEs)], for each servo track, four servo zones are defined with boundaries given by:

Track center $Zr[0]=Zr0$ where: $(V\_A-V\_B)-(V\_C-V\_D)=Wz[0]*V=0$;

Quarter track $Zr[1]=Zr25$ where: $(V\_A-V\_B)=Wz[1]*V=0$;

Half track $Zr[2]=Zr50$ where: $(V\_A-V\_B)+(V\_C-V\_D)=Wz[2]*V=0$; and

Quarter track $Zr[3]=Zr75$ where: $(V\_C-V\_D)=Wz[3]*V=0$;

wherein V_A, V_B, V_C and V_D are the head readout signal for servo bursts (continuing with this example a four burst servo pattern (i.e., A, B, C, D) is described) and Wz[j] is a linear weight of the form:

[1 -1 -1 1] for $Zr0$

[1 -1 0 0] for $Zr25$

[1 −1 1 −1] for Zr50

[0 0 1 −1] for Zr75

The TSEs may be defined by the deviation of spacing between these boundaries (width of each ¼-track servo zone) from their correct values.

TSEs delta [$L_r[0], L_r[1], L_r[2], L_r[4]$]; where $L_r[j]/z_r$ [$j+1$]−$z_r[j]$ It should be appreciated that this four servo burst and four servo zone configuration is but just one example and other configurations such as burst schemes with a 2-burst null-phase pattern can be similarly derived.

Continuing with this example, the modeled TSEs are characterized by a linearized model $L_r(z) = $ (matrix A)*(SWE). Further, a linearized modeled scan variable of the form $V(z) = $ matrix B*(SWE) may be utilized. Because both $F_z(v)$ and $F_p(v)$ may be modeled as functions of the readout signal, which is modeled by a reciprocity integral of the form—

$$V(z_r, p) = \int_{-\infty}^{\infty} H(z - z_r, p) M(z, p) dz + n(p)$$

TSEs may be determined by an equation of the form: TSEs = (matrix A)/(matrix B)*measured scan variable.

In order to make this determination, the modeled TSEs are characterized by the linear model: (matrix A)*(SWEs). In particular, matrix A includes gain values associated with the sensitivity of the TSEs with respect to the SWEs. More particularly, matrix A is filled with gain values that model the sensitivity of servo zone width with respect to the L, z, and p parameters previously described, denoted $S_L[j]$. These values may be calculated by the equations below:

$$\delta L_r[j] \approx S_L[j] p$$

$$S_L[j] = \frac{d L_r[j]}{dp} = \frac{dz_r[j+1]}{dp} - \frac{dz_r[j]}{dp}$$

$$\frac{dz_r[j]}{dp_i} = -\frac{w_z[j] \frac{\partial V}{\partial p_i}(z_r[j], p)}{w_z[j] \frac{\partial V}{\partial z_r[j]}(z_r[j], p)}$$

$S_L[j]$ models the sensitivity of servo zone width with respect to the L, $z_r$, p, and $W_z$ parameters previously described. Based upon the above, (matrix A) is a matrix formed by $S_L[j]$ as its columns. Further, $$\frac{dz_r[j]}{dp_i}$$

can be calculated based upon a pre-determined model or characterized in the disk drive.

The TSEs are also estimated from the measured scan variable. The measured scan variable is determined by measuring voltages associated with read servo bursts and the physical and disturbance characterizations of the disk drive previously described. In particular the measured scan variable may be modeled by the previously-described equation:

$$V(z_r, p) = \int_{-\infty}^{\infty} H(z - z_r, p) M(z, p) dz + n(p)$$

As above, a voltage read-out signal $V(z_r, p)$ may be determined in which $z_r$ corresponds to the reader position, p corresponds to physical parameters of the disk drive including physical characterizations and disturbance characterizations, H is the modeled reader sensitivity function, and M is the media magnetization function, as previously described. The measured scan variable may be defined as the difference of $V(z_r, p)$ and its expected value $V_0(z_r, p)$. Further, the measured scan variable may be characterized by a linear model (matrix B)*SWEs.

In particular, matrix B is filled with gain values that model the sensitivity of the measured voltage [$V(z_r, p)$] with respect to the SWEs, denoted $Sv[j]$. These values may be calculated by the equations below:

$$\delta V[j] \approx S_v[j] p$$

$$S_v[j] = \frac{d}{dp} V(z_r[j], p) = \frac{\partial V}{\partial z_r}(z_r[j], p) \frac{dz_r}{dp} + \frac{\partial V}{\partial p}(z_r[j], p)$$

$$\frac{\partial}{\partial z_r} v(z_r, p) = \int_{\infty}^{-\infty} \left(\frac{\partial}{\partial z_r} H(z - z_r, p)\right) M(z, p) dz$$

$$\frac{\partial}{\partial p} v(z_r, p) =$$

$$\int_{-\infty}^{\infty} \left(\frac{\partial}{\partial p} H(z - z_r, p) M(z, p) + H(z - z_r, p) \frac{\partial}{\partial p} M(z, p)\right) dz$$

$$\frac{\partial}{\partial p} |v(z_r, p)| = \text{sgn}(v(z_r, p)) \frac{\partial}{\partial p} v(z_r, p)$$

All of the variables and coefficients above have been discussed and are not repeated for brevity's sake. As above, $S_v[j]$ models the measured voltage [$V(z_r, p)$] with respect to the SWEs. Based upon the above, (matrix B) may be a matrix formed by $S_v[j]$ as its columns. It should be appreciated that, $S_v[j]$ can be calculated based upon a pre-determined model or characterized in the disk drive.

Further, it should be appreciated that although the equations for the determination of the scan variables and the TSEs have been characterized as being dependent upon linear models that general non-linear models may also be utilized.

Figure 6:
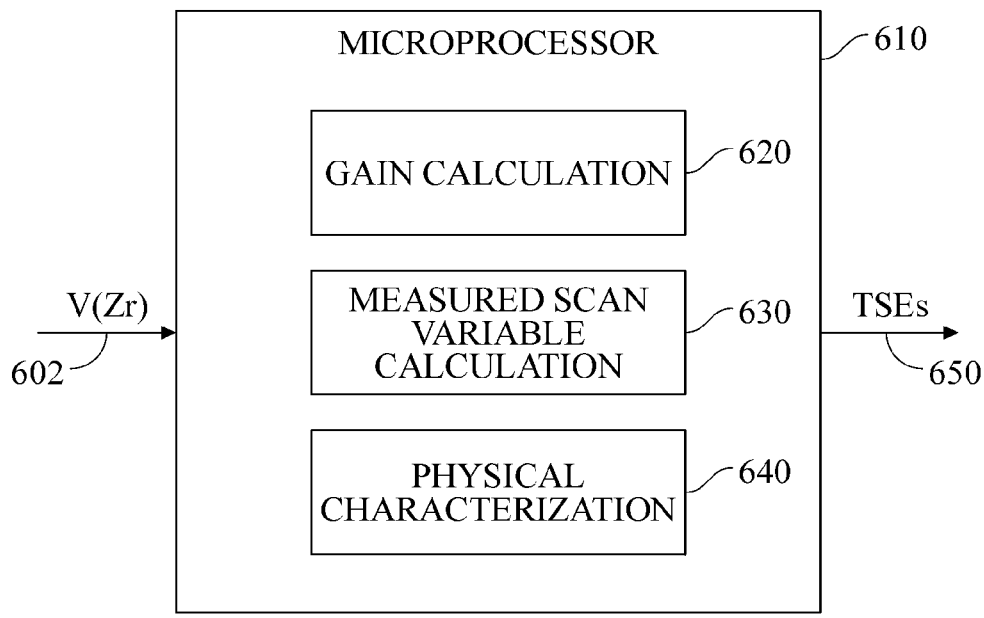
FIG. 6 is a high-level block diagram illustrating the calculation of TSEs, according to one embodiment of the invention.

FIG. 6 is a high-level block diagram illustrating the calculation of TSEs based on the previously-described calculations and characterizations. As can be seen in FIG. 6, based upon input voltages $V(z_r)$ from the head reading servo bursts (e.g. A, B, C, D) from a track of a disk that microprocessor 610 implementing gain calculation 620, measured scan variable calculation 630, and applying predetermined physical characterizations 640 of the head and disk drive, may calculate TSEs 650 in accordance with the previously-defined operations and equations. The microprocessor 610 may be the microprocessor of the disk drive itself or the microprocessor of a test computer utilized in conjunction with the testing of the disk drive.

Physical characterizations 640 are based upon predetermined p parameters that may include: writer width characterizations (Ww); reader width characterizations (Rw); and read time off-track position errors (RTE), electrical noise, etc., which may be used in determining gain values and measured scan variables, as previously described.

Moreover, as previously described, TSEs may be calculated by an equation of the form: TSE=(matrix A)/(matrix B)*measured scan variable; wherein the measured scan variable is calculated as a difference of V($z_r$, p) and its expected value V$_0$($z_r$, p).

In particular, based upon input voltages V($z_r$) and physical characterizations (p), microprocessor 610, through gain calculation 620, calculates gain values for matrix A and matrix B. As previously described, matrix A may be filled with gain values that model the sensitivity of servo zone width with respect to the L, $z_r$, and p parameters, denoted S$_L$[j]. Matrix B may be filled with gain values that model the sensitivity of the measured voltage [V($z_r$, p)] with respect to the SWEs, denoted S$_V$[j]. Further, measured scan variable calculation 630 calculates the measured scan variable as the difference between V($z_r$, p) and its expected value V$_0$($z_r$, p), utilizing the previously-described methodology.

Thus, microprocessor 610 calculates TSE=(matrix A)/(matrix B)*measured scan variable as:

$$TSEs = S_L[j] \begin{bmatrix} S_v[j_{min}] \\ \ldots \\ S_v[j_{max}] \end{bmatrix}^+ \delta \begin{bmatrix} V(z_r[j_{min}], p) \\ \ldots \\ V(z_r[j_{max}], p) \end{bmatrix}$$

Utilizing this methodology, the TSEs can be efficiently identified and characterized for a track within one scan. It should be appreciated that the greater the number of locations that are chosen to estimate TSEs consequently increases the size of matrix B and the size of the measured scan variable matrix which increases accuracy of the TSE determination such that a design trade-off can be made in terms of number of locations and accuracy versus speed and processing time. Further, the sizes of gain matrices and the measured scan variable used in each scan may be selected based on drive characterization/modeling to improve the efficiency of the TSE detection. Additionally, it should be appreciated that the location of scan is selected from the head/media characterization of the disk drive, such that one scan per servo track may be sufficient to determine the TSEs for a track.

Further, based upon the determination of the TSEs for a given track, the TSEs can be compensated for. In one embodiment, if the TSEs are determined to exceed a threshold then the track may be rejected for read/write use. In another embodiment, the TSEs may be corrected such that the track may be suitable for read/write use.

It should be appreciated that the previously-described functionality may be implemented with the microprocessor of the disk drive or with the microprocessor of a test computer connected to the disk drive. Particularly, the microprocessor may operate under the control of a program or routine to execute methods or processes in accordance with embodiments of the invention related calculate TSE values, as previously described. For example, such a program may be implemented in firmware or software and may be implemented by circuitry such as a microprocessor and/or other types of processors.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements. The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor circuitry to perform the operations described herein. The term "data" herein refers to any type of information that is encoded for machine-readable purposes. Therefore, it may include programs, code, data, files, etc.

The techniques previously described can be employed for disk drives with embedded servo systems. However, numerous alternatives for disk drives with similar or other media format characteristics can be employed by those skilled in the art to use the invention with equal advantage to implement these techniques. Further, although the embodiments have been described in the context of a disk drive with embedded servo sectors, the invention can be employed in many different types of disk drives having a head actuator that scans the media.

What is claimed is:

1. A method for identifying track squeeze errors (TSEs) of a disk of a disk drive during a testing process for the disk drive, the method comprising:
  reading servo bursts from a track of the disk, the disk including a plurality of tracks in which a substantial majority of the tracks include a plurality of servo bursts;
  utilizing a modeled scan variable;
  determining a gain, the gain comprising a ratio of a first matrix A and a second matrix B; and
  determining track squeeze errors (TSEs) associated with the servo written-in errors (SWEs) of the servo bursts for the track, the TSEs being determined as a product of the gain and a measured scan variable, the measured scan variable being calculated as a difference between a measured scan value and an estimated nominal scan value.

2. The method of claim 1, wherein the matrix A includes gain values associated with the sensitivity of the TSEs with respect to the SWEs and the matrix B includes gain values associated with the sensitivity of servo burst read-out voltage measurements with respect to the SWEs.

3. The method of claim 2, wherein the TSEs are characterized by a model that accounts for the deviation of spacing between measured servo zone boundaries from correct servo zone boundaries.

4. The method of claim 3, wherein the modeled TSEs are characterized by a linear model: (matrix A)*(SWEs).

5. The method of claim 4, where the modeled scan variable is characterized by a linear model: (matrix B)*SWEs.

6. The method of claim 5, wherein the TSEs are estimated from a measured scan variable, and the measured scan variable is determined by measuring voltages associated with read servo bursts and physical characterizations and disturbance characterizations of the disk drive.

7. The method of claim 6, wherein the measured scan variable is a function of a voltage read-out signal $V(z_r, p)$, in which V corresponds at least one measured voltage, $z_r$ corresponds to a reader position, and p corresponds to physical parameters of the disk drive including physical characterizations and disturbance characterizations.

8. The method of claim 7, where the voltage read-out signal $V(z_r, p)$ is modeled by a reciprocity integral of the form:

$$V(z_r, p) = \int_{-\infty}^{\infty} H(z - z_r, p) M(z, p) dz + n(p)$$

wherein H is a reader sensitivity function and M is a media magnetization function.

9. The method of claim 7, where the measured scan variable is defined as the difference of $V(z_r, p)$ from an expected value $V_0(z_r, p)$.

10. The method of claim 9, wherein the TSEs are calculated by an equation of the form: TSEs=(matrix A/matrix B)*measured scan variable.

11. The method of claim 10, wherein the size of matrix A, matrix B and the measured scan variable are selected based on drive characterization to improve the efficiency of the TSE detection.

12. The method of claim 10, further comprising compensating for the calculated TSEs.

13. The method of claim 12, wherein compensating for the calculated TSEs includes rejecting the track for data read/write use.

14. The method of claim 12, wherein compensating for the calculated TSEs includes correcting the TSEs such that the track is useable for data read/write.

15. The method of claim 3, wherein the modeled TSEs and the modeled scan variable are characterized by general non-linear models, respectively.

16. A system to identify track squeeze errors (TSEs) of a disk during a testing process, the system comprising:
 a disk including a plurality of tracks in which a substantial majority of the tracks include a plurality of servo bursts;
 a moveable head to read the servo bursts of the track; and
 a microprocessor for controlling operations including operations for determining track squeeze errors, the microprocessor under the control of a program to:
  read servo bursts from a track of the disk;
  utilize a modeled scan variable;
  determine a gain, the gain comprising a ratio of a first matrix A and a second matrix B; and
  determine track squeeze errors (TSEs) associated with the servo written-in errors (SWEs) of the servo bursts for the track, the TSEs being determined as a product of the gain and a measured scan variable, the measured scan variable being calculated as a difference between a measured scan value and an estimated nominal scan value.

17. The system of claim 16, wherein the matrix A includes gain values associated with the sensitivity of the TSEs with respect to the SWEs and the matrix B includes gain values associated with the sensitivity of servo burst read-out voltage measurements with respect to the SWEs.

18. The system of claim 17, wherein the TSEs are characterized by a model that accounts for the deviation of spacing between measured servo zone boundaries from correct servo zone boundaries.

19. The system of claim 18, wherein the modeled TSEs are characterized by a linear model: (matrix A)*(SWEs).

20. The system of claim 19, where the modeled scan variable is characterized by a linear model: (matrix B)*SWEs.

21. The system of claim 20, wherein microprocessor further estimates the TSEs from the measured scan variable, and the measured scan variable is determined by measuring voltages associated with read servo bursts and physical characterizations and disturbance characterizations of the disk drive.

22. The system of claim 21, wherein the measured scan variable is a function of a voltage read-out signal $V(z_r, p)$, in which V corresponds at least one measured voltage, $z_r$ corresponds to a reader position, and p corresponds to physical parameters of the disk drive including physical characterizations and disturbance characterizations.

23. The system of claim 22, wherein the microprocessor models the voltage read-out signal $V(z_r, p)$ by a reciprocity integral of the form:

$$V(z_r, p) = \int_{-\infty}^{\infty} H(z - z_r, p) M(z, p) dz + n(p)$$

wherein H is a reader sensitivity function and M is a media magnetization function.

24. The system of claim 22, wherein the measured scan variable is defined as the difference of $V(z_r, p)$ from an expected value $V_0(z_r, p)$.

25. The system of claim 24, wherein the microprocessor calculates the TSEs by an equation of the form: TSEs=(matrix A/matrix B)*measured scan variable.

26. The system of claim 25, wherein the microprocessor compensates for the calculated TSEs.

27. The system of claim 26, wherein compensating for the calculated TSEs includes rejecting the track for data read/write use.

28. The system of claim 26, wherein compensating for the calculated TSEs includes correcting the TSEs such that the track is useable for data read/write.

29. The method of claim 24, wherein the size of matrix A, matrix B and the measured scan variable are selected based on drive characterization to improve the efficiency of the TSE detection.

30. The system of claim 16, further comprising a disk drive wherein the disk drive includes the disk, the moveable head, and the microprocessor.

31. The system of claim 16, further comprising a test computer coupled to a disk drive, wherein the test computer includes the microprocessor and the disk drive includes the disk and the moveable head.

* * * * *